United States Patent Office 2,899,429
Patented Aug. 11, 1959

2,899,429

NITROETHYLENES

Dale N. Robertson, Midland, Mich., assignor to The Dow Chemical Company, Midland, Mich., a corporation of Delaware No Drawing. Application October 18, 1956
Serial No. 616,652

6 Claims. (Cl. 260—240)

The present invention relates to an improved process for the production of nitroethylenes and particularly to α-arylnitroethylenes.

The α-arylnitroethylenes have the general formula $$R-CH=\overset{Ar}{\underset{|}{C}}-NO_2$$

In this and succeeding formulae, R represents a member of the group consisting of aromatic radicals of the benzene, naphthalene, thiophene and furan series, and Ar represents an aryl radical of the benzene series. The expression "aryl radical of the benzene series" is inclusive of phenyl, and phenyl substituted by halogen, alkyl, alkoxy and nitro radicals. When R represents an aryl radical, the compounds are generally referred to as nitrostilbenes. These compounds are useful in biological systems, as chemical intermediates and as toxic constituents of pesticidal preparations.

The preparation of the α-arylnitroethylenes has heretofore generally been carried out by the condensation of an aromatic aldehyde with an arylnitromethane such as phenylnitromethane or substituted phenylnitromethane in the presence of a basic catalyst and usually in the presence of a solvent such as alcohol. The time necessary for carrying out this reaction varies in length up to eight or more weeks and the yields of the products are frequently low. When alcohol is used as solvent, many by-products are oftentimes formed making purification difficult and requiring tedious procedures for isolation of the desired product.

Procedures requiring lengthy reaction times are impractical. A preparative method requiring short reaction time with high yield of the product, as well as obviating the necessity for tedious isolation of the desired product from a crude mixture of the reaction products is highly desirable.

It is an object of the present invention to provide a procedure for the preparation of nitroethylenes which is more rapid and practical than previously known methods. Another object of the invention is to provide a method by which high yields of the desired products may be obtained. An additional object is to provide a procedure whereby the desired products may be obtained in relatively high purity rendering unnecessary, difficult and tedious isolation procedures. Other objects will be evident from the following specification and claims.

It has been discovered that nitroethylenes may be prepared in good yields and in high purity by a method wherein a Schiff base of the aldehyde is prepared, and which includes the novel step of causing the Schiff base to react with an arylnitromethane to produce the desired nitroethylene compounds. In accordance with this invention, arylnitroethylenes having the general formula $$R-CH=\overset{Ar}{\underset{|}{C}}-NO_2$$

are prepared by the reaction of (1) a Schiff base having the structure $$RCH=NR'$$

wherein R' is a lower alkyl radical with (2) an arylnitromethane having the formula $$ArCH_2NO_2$$

in the presence of an organic acid.

The reaction between the Schiff base and the arylnitromethane may be represented in the following manner:

$$RCH=NR' + ArCH_2NO_2 \longrightarrow R-CH=\overset{Ar}{\underset{|}{C}}-NO_2 + R'NH_2$$

The Schiff base reactant may be prepared by condensing an appropriate aldehyde having the formula $$RCHO$$

with a primary amine having the formula $$R'NH_2$$

while many Schiff bases of a given aldehyde may be employed, the preferred Schiff bases are those obtained by the reaction of the aldehyde with a primary amine containing from 3 to 6 carbon atoms. Particularly suitable amines for the preparation of the Schiff bases are butylamine and amylamine.

The aldehydes employed in the preparation of the Schiff bases for the practice of this invention are cyclic aldehydes in which the aldehyde group is directly attached to an unsaturated ring structure. By unsaturated ring structure is meant benzene, naphthalene, furan or thiophene or substituted derivatives thereof. Representative aldehydes which may be employed in the present reaction are benzaldehyde, 2-naphthaldehyde, furfural, 2-thiophenealdehyde, p-methoxybenzaldehyde, 3,4-methylenedioxybenzaldehyde, 3-thiophenealdehyde, 3,4-dimethoxybenzaldehyde, o-methylbenzaldehyde, 3,4-dimethyl-2-furaldehyde, o-methoxybenzaldehyde, 5-bromo-2-thiophenealdehyde, o-nitrobenzaldehyde, p-nitrobenzaldehyde, m-nitrobenzaldehyde, 4-tertiary-butyl-2-furaldehyde, 5-bromo-1-naphthaldehyde, 1-naphthaldehyde, 4,8-dimethoxy-1-naphthaldehyde, 5-chloro-2-furaldehyde, 5 - bromo - 8-nitro-1-naphthaldehyde, 4-hydroxy-2-naphthaldehyde, 4-isopropyl-2-furaldehyde, 5-bromo-2-furaldehyde, 5-nitro-2-furaldehyde and 5-methyl-2-furaldehyde The Schiff base is prepared by mixing the appropriate aldehyde with substantially equimolar proportions or a slight excess of a primary aliphatic amine in an inert water-immiscible organic solvent. The water which forms as one product of the reaction is promptly removed from the reaction zone by codistilling therefrom with solvent. The water may then be separated from the solvent and the solvent returned to the reaction zone, or fresh solvent may be added to replace that lost by distillation. Any remaining solvent and excess amine, if employed, is then removed by distillation and the desired Schiff base recovered as residue. Usually the Schiff base is of sufficient purity to be employed for preparative procedures. Where a product of higher purity is desirable, the product may be purified by conventional means such as by distillation. The Schiff base thus obtained is employed for the preparation of the α-arylnitroethylene.

The organic solvent suitable for use in the preparation of the Schiff base should be water-immiscible and non-reactive, preferably a hydrocarbon such as benzene, toluene, cyclohexane, octane and xylene.

In the preparation of the α-arylnitroethylene compounds, the Schiff base is mixed with a substantially equimolar proportion of an arylnitromethane in the presence of a lower aliphatic organic acid. The presence of such an acid is necessary for the formation of a nitroethylene product essentially free of by-products. For the successful operation of this step, the aliphatic organic acid should be relatively free of water and low molecular weight polar solvents. The substantially anhydrous acid must be present in at least equimolar proportion and a substantial excess of the acid is desirable. A two to threefold molar excess is considered a preferable amount. Lower aliphatic organic acids containing from 1 to 4 carbon atoms, inclusive, such as propionic, acetic, formic and butyric acid are operable and the preferred acid is acetic acid.

In a preferred method for carrying out this reaction, approximately equimolar proportions of an appropriate aldehyde and a primary aliphatic amine are mixed together in a suitable solvent to produce a Schiff base of the desired aldehyde. The order of addition is not critical. Following the mixing step, the resulting solution is heated to codistill the water of reaction with a portion of the solvent. This operation is conveniently carried out in a reaction vessel equipped with a condenser and a trap wherein the condensed distillate is collected, the water and solvent separated and the latter returned to the reaction zone. The course of the reaction may be followed by observing the quantity of water obtained from the reaction, the reaction being considered complete when no more water is formed. The length of time required to complete the reaction will depend on the solvent, the particular reactants, the quantities of materials used and the rate of distillation. When benzene is employed as solvent and butylamine is the aliphatic amine, the reaction is generally complete in from 0.5 to 1 hour. After completion of the reaction, the solution is heated to distill out any remaining solvent and amine and to obtain the Schiff base as residue. The Schiff base may be purified by conventional means such as by fractional distillation, if desired. Solvent removal and distillation are preferably carried out under reduced pressure to minimize side reactions and by-product formation.

The Schiff base and an arylnitromethane are mixed together in a suitable aliphatic acid and allowed to remain in contact in the temperature range of from 20° C. to 150° C. for at least one minute. The resulting reaction is usually exothermic and the reaction mixture becomes yellow as the reaction proceeds. In the preferred method, the reaction is carried out in the temperature range of from 20° C. to 40° C. for a period of from 5 minutes to several hours. Usually the desired nitroethylene product starts to precipitate from the reaction mixture in from 0.5 to 1 hour.

When the precipitation of the product is substantially complete, the reaction mixture is then filtered to recover the desired nitroethylene product. The product may be purified if desired by washing with ethanol or recrystallizing therefrom.

Frequently the product is quite soluble in the aliphatic acid and may tend to form a supersaturated solution therein. In such cases, the separation and recovery of the nitroethylene compound may be facilitated by pouring the reaction mixture into water to precipitate the desired product or by seeding with crystals of the compound. Where the reaction takes place very rapidly and the mixture becomes colored, it is desirable to precipitate the product quickly by pouring the reaction mixture into ice-water to minimize side reactions.

If desired, additional product may be obtained by cooling or concentrating the mother liquor or allowing the reaction mixture or mother liquor to stand for from one to three days. However, since the major portion of the product usually precipitates within a few hours, it is considered more practical to reemploy the alkanoic acid liquor unless diluted with water for subsequent preparation of the same α-nitroarylethylene compound.

The time required for the reaction of the Schiff base and arylnitromethane as discussed above may be further decreased for the preparation of most arylnitroethylenes by heating the reaction mixture to or near the boiling point for a period of from 1 to 5 minutes and then pouring the mixture into ice and/or water to precipitate the desired product. This method is less desirable for the preparation of α-arylnitroethylene compounds which tend to undergo side reactions such as α-nitrostilbene and 2-(β-nitrostyryl)furan.

The following examples illustrate the invention but are not to be construed as limiting:

*Example 1.—α-Nitrostilbene*

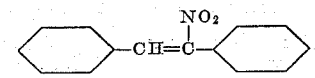

53 grams (0.5 mole) of benzaldehyde was dissolved in 100 milliliters of benzene and 55 milliliters (0.55 mole) of normal-butylamine added thereto. The resulting mixture was heated to distill the water of reaction as a benzene-water azeotrope. When water formation was complete, remaining solvent and excess amine were distilled off under reduced pressure to obtain as residue an N-benzylidene-normal-butylamine (Schiff base) product. The product was purified by distillation to obtain a colorless liquid boiling at 116°–117° C. at 16 millimeters pressure. The N-benzylidene-normal-butylamine product had a refractive index $n_D^{25°}$ C. of 1.5236 and amounted to 71.2 grams or 88.5 percent of theoretical.

16.1 grams (0.1 mole) of the above Schiff base product and 13.7 grams (0.1 mole) of phenylnitromethane were dissolved in 25 milliliters of glacial acetic acid and the resulting mixture allowed to stand at room temperature. After about 0.5 hour, the reaction vessel was scratched, whereupon a product precipitated in the reaction mixture. After about 2 hours the mixture was filtered and the precipitate washed with ethanol to recover 13.2 grams of an α-nitrostilbene product. The mother liquor was allowed to stand for 12 hours to precipitate an additional 3 grams of product which was recovered by filtration. The filtrate was then poured into water to precipitate additional product. The latter was recovered by filtration and dried over phosphorus pentoxide under reduced pressure. The combined yield of product amounted to 21.4 grams or 95.1 percent of theoretical. The product after recrystallization from alcohol melted at 73.5°–74° C.

*Example 2.—2-(β-nitrostyryl)thiophene*

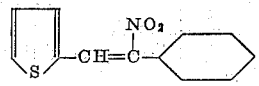

11.2 grams (0.1 mole) of 2-thiophenealdehyde and 10 milliliters (0.1 mole) of normal-butylamine were mixed in 50 milliliters of benzene and the water distilled out azeotropically. The remaining benzene and excess amine were removed by distillation under reduced pressure to obtain as residue the Schiff base product.

13.7 grams (0.1 mole) of phenylnitromethane and 20 milliliters of glacial acetic acid were added to the residue of the above operation whereupon an exothermic reaction took place. The resulting mixture was allowed to stand in the dark at room temperature and after about 2 hours the reaction vessel was scratched whereupon a crystalline product precipitated immediately. The mixture was allowed to stand for three days and then filtered to obtain a 2-(β-nitrostyryl)thiophene product. The latter was recrystallized from ethanol to obtain a purified product, melting at 126.5°–127° C. in a yield of 18.8 grams or 81.4 percent of theoretical.

*Example 3.—2-(β-nitrostyryl)furan*

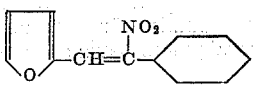

350 milliliters of benzene, 96 grams (1 mole) of furfural and 80.5 grams (110 milliliters; 1.1 moles) of normal-butylamine were mixed together and the water of reaction distilled out as formed. The remaining solvent and excess amine were then recovered by distillation under reduced pressure to obtain the Schiff base product as residue. The residue was distilled to obtain 130 grams of an N-(2-furfurylidene)-normal-butylamine product boiling at 80°–87° C. at 10 millimeters pressure.

6.9 grams (0.05 mole) of phenylnitromethane was dissolved in 15 milliliters of glacial acetic acid and 7.6 grams (0.05 mole) of N-(2-furfurylidene)-normal-butylamine added thereto with mixing. An exothermic reaction took place with a formation of a yellow color in the reaction mixture. The mixture was allowed to stand at room temperature in the dark for about 15 minutes and then poured into an ice-water mixture whereupon a solid precipitated. The latter was recovered by filtration, and recrystallized from ethanol to obtain a purified product melting at 87.5°–88° C. A first crop of the purified product amounted to 8.7 grams or 81.3 percent of theoretical.

*Example 4.—2-(2-chloro-β-nitrostyryl)furan*

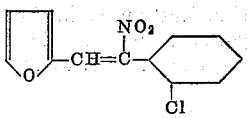

8.6 grams (0.05 mole) of 2-chlorophenylnitromethane was dissolved in 10 milliliters of glacial acetic acid and 7.6 grams (0.05 mole) of the N-(2-furfurylidene)-normal-butylamine prepared in Example 3 was added thereto with stirring. An exothermic reaction took place with the formation of a yellow solution which turned orange within ten minutes. The reaction mixture was then poured into ice and water with stirring whereupon a solid precipitated. The mixture was filtered to obtain a 2-(2-chloro-β-nitrostyryl)furan product. The latter was recrystallized from ethanol to obtain a purified product melting at 103°–104° C. The yield of the first crop of the recrystallized product amounted to 10.3 grams or 82.4 percent of theoretical.

*Example 5.—α,4'-dinitrostilbene*

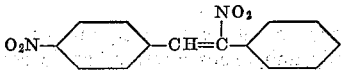

15.1 grams (0.1 mole) of p-nitrobenzaldehyde, 10 milliliters (0.1 mole) of normal-butylamine and 75 milliliters of benzene were mixed together and the water of reaction and benzene azeotropically distilled out of the reaction mixture over a period of about 0.5 hour. The remaining benzene was separated by distillation to obtain an N-(4-nitrobenzylidene)-normal-butylamine product as residue.

The N-(4-nitrobenzylidene)-normal-butylamine product thus obtained was added at room temperature to a solution of 13.7 grams (0.1 mole) of phenylnitromethane in 20 milliliters of glacial acetic acid. A reaction took place immediately with the formation of a yellow colored solution. The mixture was allowed to stand in the dark for about 2.5 hours and the reaction vessel scratched to precipitate an α,4'-dinitrostilbene product as yellow crystalline needles. The mixture was allowed to stand an additional hour and then filtered. The separated precipitate was washed with ethanol and recrystallized from ethanol to obtain a purified product melting at 159.3°–159.8° C. The yield of the first crop of the crystallized product was 17.3 grams or 64.8 percent of theoretical.

*Example 6.—α,3'-dinitrostilbene*

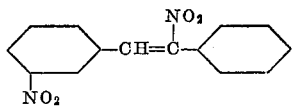

15.1 grams (0.1 mole) of m-nitrobenzaldehyde, 10 milliliters (0.1 mole) of normal-butylamine and 75 milliliters of benzene were mixed together and heated to distill off the water of reaction as a benzene-water azeotrope. After completion of the reaction, the remaining benzene was distilled off to obtain an N-(3-nitrobenzylidene)-normal-butylamine product as residue.

To the N-(3-nitrobenzylidene)-normal-butylamine product thus obtained was added a solution of 13.7 grams (0.1 mole) of phenylnitromethane in 20 milliliters of glacial acetic acid. The mixture was placed in the dark and allowed to stand overnight. The reaction vessel was then scratched to precipitate the product and cooled in the refrigerator (5° C.) about 1 hour to complete the precipitation. The mixture was filtered and the separated precipitate washed with ethanol and recrystallized from an ethanol-dioxane mixture to obtain an α,3'-dinitrostilbene product melting at 112.8°–113.8° C. The yield of the first crop of the recrystallized product amounted to 19.4 grams or 71.8 percent of theoretical.

*Example 7.—2-methoxy-α'-nitrostilbene*

19.1 grams (0.1 mole) of an N-(o-anisylidene)-normal-butylamine boiling at 84°–96° C. at 0.05 millimeter and 13.7 grams (0.1 mole) of phenylnitromethane were mixed together in glacial acetic acid. The resulting mixture was heated to the boiling point and maintained at the boiling point for a few seconds (a total reaction time of about 1 minute). The reaction mixture was then poured onto crushed ice whereupon a 2-methoxy-α'-nitrostilbene product precipitated as a yellow solid. The mixture was allowed to stand about 1 hour and the product recovered by filtration, washed with water and dried at reduced pressure over calcium chloride. The yield of the product was 24.4 grams or 95.5 percent of theoretical. The melting point of the product after recrystallization from ethanol was 117°–118° C.

*Example 8.—1-(β-nitrostyryl)naphthalene*

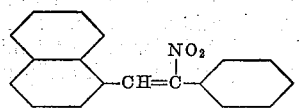

15 grams (0.1 mole) of 1-naphthaldehyde, 10 milliliters (0.1 mole) of normal-butylamine and 75 milliliters of benzene were mixed together and the resulting mixture heated to distill off the water of reaction as a benzene-water azeotrope. The remaining benzene was distilled out under reduced pressure to obtain an N-(1-naphthylidene)-normal-butylamine product as residue.

13.7 grams (0.1 mole) of phenylnitromethane and 20 milliliters of glacial acetic acid are added to the above residue and the resulting mixture stirred. An exothermic reaction took place. The mixture was placed in the dark and allowed to stand overnight to obtain a yellow crystalline solid product. The latter was filtered from the mixture and recrystallized from ethanol to recover a purified 1-(β-nitrostyryl)naphthalene product melting at 122°–122.5° C. The yield of the first crop of the recrystallized product was 18.9 grams or 68.7 percent of theoretical.

Certain new compounds prepared in accordance with the method of the present invention are disclosed and claimed in copending applications filed concurrently herewith as Serial Numbers 616,645; 616,651; 616,653 and 616,657, in the name of Dale N. Robertson.

I claim:

1. A process for preparing α-arylnitroethylenes having the formula

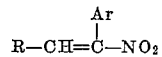

wherein R represents a radical selected from the group consisting of the benzene, naphthalene, thiophene and furan radicals, and Ar represents an aryl radical selected from the group consisting of the benzene radicals, which comprises reacting a Schiff base having the structure

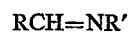

wherein R is as above defined and R' is a lower alkyl radical containing from 3 to 6 carbon atoms, inclusive, with a substantially equimolar proportion of an arylnitromethane having the structure $$ArCH_2NO_2$$

wherein Ar is as above defined, in the presence of at least an equimolar proportion of a substantially anhydrous lower alkanoic acid at a temperature in the range of from 20° C. to 150° C. for at least 1 minute.

2. A process according to claim 1 wherein substantially equimolar amounts of the Schiff base and the arylnitromethane are reacted together in the presence of excess on a molar basis of acetic acid at a temperature in the range of from 20° C. to 40° C. for at least 5 minutes.

3. A process for preparing α-nitroethylenes having the formula

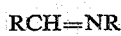

wherein R represents a radical selected from the group consisting of the benzene, naphthalene, thiophene and furan radicals, and Ar represents an aryl radical selected from the group consisting of the benzene radicals, which comprises reacting a Schiff base having the structure $$RCH{=}NR'$$

wherein R is as above defined and R' is a lower alkyl radical, with a substantially equimolar proportion of an arylnitromethane having the structure $$ArCH_2NO_2$$

wherein Ar is as above defined, in the presence of at least an equimolar proportion of a substantially anhydrous lower alkanoic acid at a temperature in the range of from 20° C. to 150° C. for at least 1 minute.

4. A process for preparing α-nitrostilbene having the formula

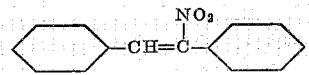

which comprises reacting a Schiff base having the structure

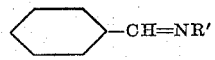

wherein R' is a lower alkyl radical with a substantially equimolar proportion of an arylnitromethane having the structure

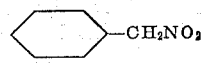

in the presence of at least an equimolar proportion of a substantially anhydrous lower alkanoic acid at a temperature in the range of from 20° C. to 150° C. for at least 1 minute.

5. A process for preparing 2-(β-nitrostyryl)thiophene having the structure

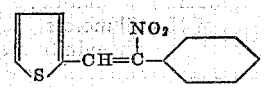

which comprises reacting a Schiff base having the structure

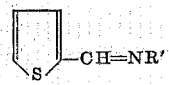

wherein R' is a lower alkyl radical with a substantially equimolar proportion of an arylnitromethane having the structure

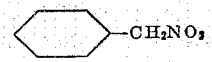

in the presence of at least an equimolar proportion of a substantially anhydrous lower alkanoic acid at a temperature in the range of from 20° C. to 150° C. for at least 1 minute.

6. A process for preparing 2-(β-nitrostyryl)furan having the formula

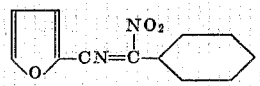

which comprises reacting a Schiff base having the structure

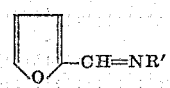

wherein R' is a lower alkyl radical with a substantially equimolar proportion of an arylnitromethane having the structure

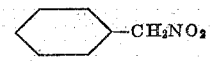

in the presence of at least an equimolar proportion of a substantially anhydrous lower alkanoic acid at a temperature in the range of from 20° C. to 150° C. for at least 1 minute.

References Cited in the file of this patent

UNITED STATES PATENTS 2,601,282    Heinzelmann _____ June 24, 1952

OTHER REFERENCES

Moldenhauer et al.: Justus Liebig's Annalen der Chemie, vol. 583, pages 50–61 (1953).

Bahner et al.: Journal of the American Chemical Society, vol. 70, p. 1982 (1948).

Gilsdorf et al.: Journal of Organic Chemistry, vol. 15, pp. 807–811 (1950).